UNITED STATES PATENT OFFICE.

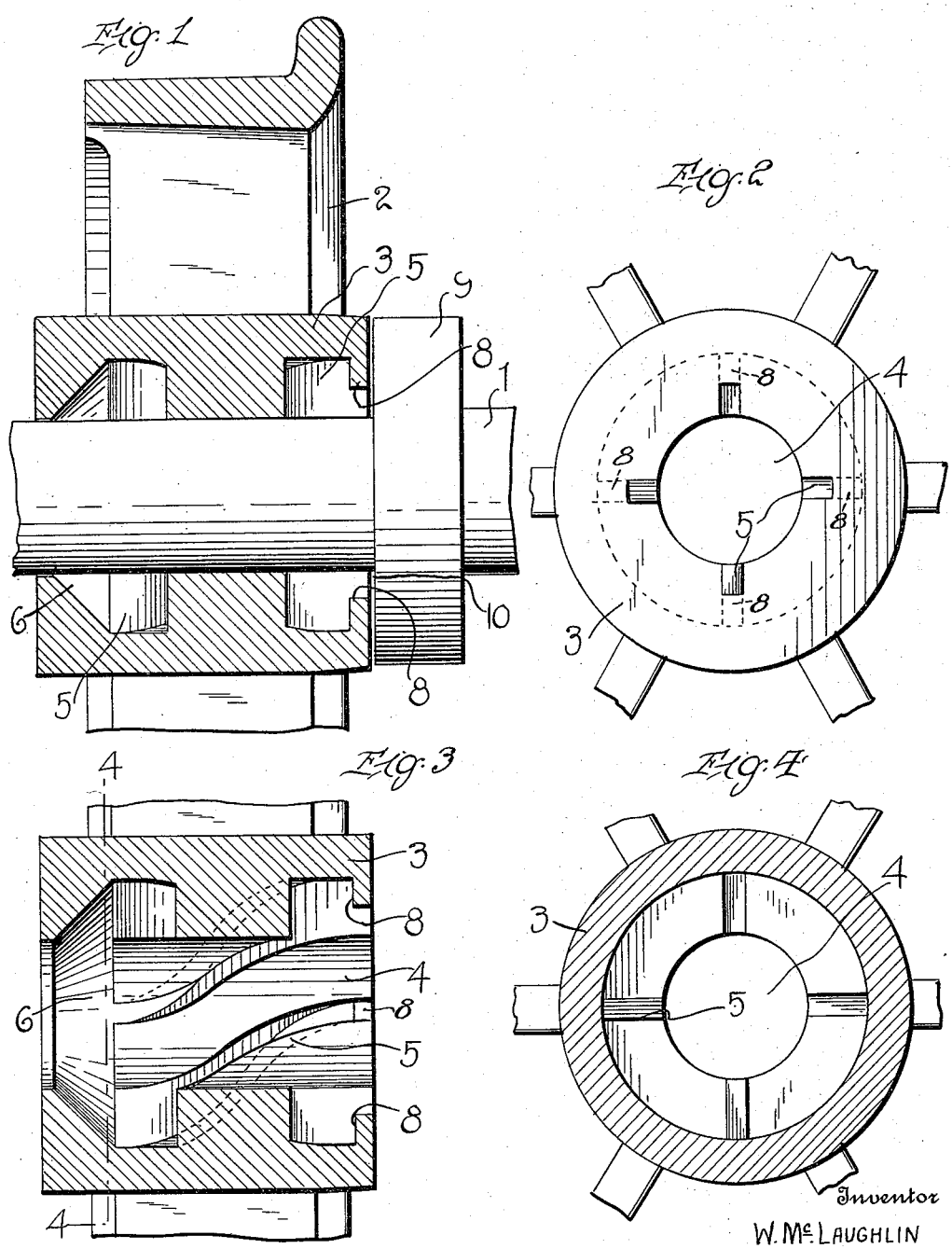

WILLIAM McLAUGHLIN, OF SCRANTON, PENNSYLVANIA.

LUBRICATING DEVICE.

1,157,023.   Specification of Letters Patent.   Patented Oct. 19, 1915.

Application filed March 4, 1914. Serial No. 822,414.

*To all whom it may concern:*

Be it known that I, WILLIAM MCLAUGH-LIN, a citizen of the United States, residing at Scranton, in the county of Lackawanna and State of Pennsylvania, have invented certain new and useful Improvements in Lubricating Devices, of which the following is a specification, reference being had to the accompanying drawings.

This invention relates to new and useful improvements in lubricating devices and more particularly to a device of this character which is generally applicable to car wheels and the like, the main object of the invention being the provision of a lubricating system whereby the axle and journal bearing of a car wheel or the like may be readily lubricated.

Another object of the present invention is the provision of a lubricating device of the above character which will possess advantages in points of efficiency and durability, is inexpensive to manufacture and one which will be very efficient and useful in operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a transverse sectional view taken through the hub of a wheel illustrating my improved lubricating system. Fig. 2 is an end elevation of the hub. Fig. 3 is a longitudinal sectional view through the hub; and Fig. 4 is a transverse sectional view taken on the line 4—4, Fig. 3.

As disclosed in the accompanying drawings, 1 denotes an axle with which is rotatably engaged the hub 3 of the wheel 2. The wall of the bore 4 of the hub is provided with the spaced longitudinally disposed grooves 5, the outer extremities thereof being in communication with the annular oil cellar 6, the walls of which converge toward the outer end of the hub.

The inner extremities of the grooves 5 are partially closed by the inwardly directed lips 8 positioned at the bases of the grooves whereby the discharge of the lubricant between the hub 3 and the bearing collar 9, suitably affixed to the axle 1, will be retarded, for a purpose which is believed to be clearly apparent to those skilled in the art to which my invention appertains. It is to be observed that the maximum diameter of the cellar 6 is such as to have the bases or bottoms of the grooves 5 substantially flush with the inner margin of the cellar.

It will be noted that I have provided a simple lubricating device which can be applied to any of the general forms of car wheels at a very small cost and will save considerable time and money in changing the old wheels, which have become worn, for new ones. It will be noted from the accompanying drawings, that the grooves 5 all extend in one general direction but it will be apparent that they may extend in either direction or half extend in one direction and the other half in the other direction.

While I have shown and described the preferred form of my invention, it will be obvious that various changes in the details of construction and in the proportions may be resorted to for successfully carrying my invention into practice, without sacrificing any of the novel features or departing from the scope of the appended claims.

Having thus described this invention, what I claim is:—

1. A wheel including a hub, the bore thereof at one extremity being enlarged to afford an oil cellar and having a plurality of longitudinally disposed spiral grooves arranged therealong and in communication at one of their ends with the oil cellar, the opposite ends of the grooves being partially closed.

2. A wheel including a hub, the bore thereof at one extremity being enlarged to afford an oil cellar and having a plurality of longitudinally disposed spiral grooves arranged therealong and in communication at one of their ends with the oil cellar, and lips projecting inwardly from the bottoms of the grooves at their opposite ends and partially closing such ends.

In testimony whereof I hereunto affix my signature in the presence of two witnesses.

WILLIAM McLAUGHLIN.

Witnesses:
C. S. FARRER,
R. L. KISSINGER.

Copies of this patent may be obtained for five cents each, by addressing the "Commissioner of Patents, Washington, D. C."